United States Patent
Yehaskel et al.

(10) Patent No.: US 8,909,623 B2
(45) Date of Patent: Dec. 9, 2014

(54) SYSTEM AND METHOD FOR EVALUATING SEARCH QUERIES TO IDENTIFY TITLES FOR CONTENT PRODUCTION

(75) Inventors: David M. Yehaskel, Austin, TX (US); Henrik M. Kjallbring, Austin, TX (US)

(73) Assignee: Demand Media, Inc., Santa Monica, CA (US)

( * ) Notice: Subject to any disclaimer, the term of this patent is extended or adjusted under 35 U.S.C. 154(b) by 210 days.

(21) Appl. No.: 12/826,524

(22) Filed: Jun. 29, 2010

(65) Prior Publication Data
US 2011/0320444 A1 Dec. 29, 2011

(51) Int. Cl.
*G06F 17/30* (2006.01)
*G06Q 30/02* (2012.01)

(52) U.S. Cl.
CPC .......... *G06Q 30/02* (2013.01); *G06F 17/30864* (2013.01)
USPC ............ 707/723; 707/721; 707/748; 707/776

(58) Field of Classification Search
CPC .............. G06Q 30/02; G06Q 30/0275; G06Q 30/0277; G06Q 30/0273; G06Q 30/0254; G06Q 30/0251; G06Q 30/0272; G06Q 30/08; G06Q 30/00; G06Q 30/0201; G06Q 30/0253; G06F 17/30864; G06F 17/30867; G06F 17/30507; G06F 17/3053; G06F 11/00
USPC ......... 707/100, 723, 722, 726, 731, 748, 769, 707/776
See application file for complete search history.

(56) References Cited

U.S. PATENT DOCUMENTS

| | | | |
|---|---|---|---|
| 5,974,412 A | 10/1999 | Hazlehurst et al. | |
| 6,199,061 B1 | 3/2001 | Blewett et al. | |
| 7,599,922 B1 | 10/2009 | Chen et al. | |
| 7,617,203 B2 * | 11/2009 | Awadallah et al. | .... 707/999.005 |
| 7,636,732 B1 | 12/2009 | Nielsen | |
| 7,725,417 B2 * | 5/2010 | Loftus et al. | ..................... 706/47 |
| 7,788,252 B2 * | 8/2010 | Delli Santi et al. | ........... 707/708 |
| 7,814,112 B2 * | 10/2010 | Gupta et al. | .................. 707/758 |
| 7,885,952 B2 * | 2/2011 | Chellapilla et al. | ........... 707/710 |
| 8,037,063 B2 * | 10/2011 | Oldham et al. | ............... 707/723 |

(Continued)

FOREIGN PATENT DOCUMENTS

| | | |
|---|---|---|
| KR | 1020040063641 | 7/2004 |
| WO | 2011106197 | 9/2011 |
| WO | 2012006021 | 1/2012 |
| WO | 2012033561 | 3/2012 |

OTHER PUBLICATIONS

International Patent Application No. PCT/US2011/042021, International Search Report and Written Opinion, Feb. 9, 2012.

(Continued)

*Primary Examiner* — Jay Morrison
*Assistant Examiner* — Dangelino Gortayo
(74) *Attorney, Agent, or Firm* — Greenberg Traurig LLP

(57) ABSTRACT

Systems and methods are provided to select potential titles for online content using search query logs from web search service providers. A plurality of search queries are collected from one or more web search service providers. A lifetime value is determined for each of the search queries. Potential titles are then selected from the plurality of search queries using selection criteria including the lifetime value of the search queries. The potential titles can then be provided to content developers who develop online content based on the potential titles.

17 Claims, 3 Drawing Sheets

(56) References Cited

U.S. PATENT DOCUMENTS

| | | | |
|---|---|---|---|
| 8,041,596 B2* | 10/2011 | Graham et al. | 705/7.29 |
| 8,620,944 B2 | 12/2013 | Yehaskel et al. | |
| 2002/0073019 A1 | 6/2002 | Deaton | |
| 2004/0249808 A1 | 12/2004 | Azzam et al. | |
| 2005/0055341 A1 | 3/2005 | Haahr et al. | |
| 2006/0074853 A1 | 4/2006 | Liu et al. | |
| 2006/0155656 A1 | 7/2006 | Kreder et al. | |
| 2007/0033165 A1 | 2/2007 | Sheinwald et al. | |
| 2007/0239542 A1* | 10/2007 | Shapiro | 705/14 |
| 2007/0239698 A1 | 10/2007 | Quinn-Jacobs | |
| 2007/0266342 A1 | 11/2007 | Chang et al. | |
| 2008/0016019 A1 | 1/2008 | Loftus et al. | |
| 2008/0104542 A1 | 5/2008 | Cohen et al. | |
| 2008/0133498 A1* | 6/2008 | Patel | 707/5 |
| 2008/0201251 A1* | 8/2008 | Magdon-Ismail et al. | 705/37 |
| 2008/0208815 A1* | 8/2008 | Taylor | 707/3 |
| 2009/0037421 A1* | 2/2009 | Gamble | 707/10 |
| 2009/0077124 A1 | 3/2009 | Spivack et al. | |
| 2009/0119268 A1 | 5/2009 | Bandaru et al. | |
| 2009/0228439 A1 | 9/2009 | Manolescu et al. | |
| 2009/0248510 A1 | 10/2009 | Ahluwalia | |
| 2009/0254543 A1 | 10/2009 | Ber et al. | |
| 2009/0292687 A1 | 11/2009 | Fan et al. | |
| 2009/0327223 A1 | 12/2009 | Chakrabarti et al. | |
| 2010/0082452 A1 | 4/2010 | Speers et al. | |
| 2010/0131902 A1 | 5/2010 | Teran et al. | |
| 2010/0138421 A1 | 6/2010 | Oldham et al. | |
| 2010/0211564 A1 | 8/2010 | Cohen et al. | |
| 2010/0250335 A1* | 9/2010 | Cetin et al. | 705/10 |
| 2011/0093488 A1 | 4/2011 | Amacker et al. | |
| 2011/0145058 A1* | 6/2011 | Liu et al. | 705/14.45 |
| 2011/0208758 A1 | 8/2011 | Yehaskel et al. | |
| 2011/0213655 A1* | 9/2011 | Henkin et al. | 705/14.49 |
| 2011/0251901 A1* | 10/2011 | Kwon et al. | 705/14.71 |
| 2012/0059849 A1 | 3/2012 | Yehaskel et al. | |
| 2012/0072435 A1 | 3/2012 | Han | |

OTHER PUBLICATIONS

International Patent Application Serial No. PCT/US2011/024878, International Search Report and Written Opinion, Sep. 9, 2011.
International Patent Application Serial No. PCT/US2011/042021, International Search Report and Written Opinion, Feb. 2, 2012.
International Patent Application Serial No. PCT/US2011/042460, International Search Report and Written Opinion, Feb. 17, 2012.
Orenstein, David, "Stanford Software is Gaining the Sophistication to Comprehend What Humans Write", Stanford Report, Feb. 18, 2010, 2 pages. Available at: http://news.stanford.edu/news/2010/february15/manning-aaas-computers-021910.html.
Park, Hong-Won, "Natural Language Based Information Retrieval System Considering the Focus of the Question", Korean Institute of Information Scientists and Engineers Conference, Oct. 10, 2009, abstract.

* cited by examiner

SYSTEM AND METHOD FOR EVALUATING SEARCH QUERIES TO IDENTIFY TITLES FOR CONTENT PRODUCTION

FIELD OF THE TECHNOLOGY

At least some embodiments disclosed herein relate, in general, to systems for analyzing the content of web search queries, and more particularly, to identifying titles for online content that may be of interest to end users.

BACKGROUND

There is a wide variety of content available on the Internet, but such content may fail to provide full coverage of many topics of interest to users. This information gap provides an opportunity for information service providers to create new content or repackage existing online content that relates to such topics. Creation of such content creates revenue generation opportunities. Service providers can be enabled to, for example, derive direct revenue from selling such content to other website providers or directly to users, or via advertising revenues associated with website providing such content to users for free.

One of the greatest challenges, however, is identifying content that has the greatest potential for generating revenue. Within a narrow subject area, experts in the subject area may have a rough idea of what topics are of the greatest interest to users, but cannot provide quantitative estimates of potential revenue streams from content created relating to such topics. Furthermore, in some cases, popular interests may run ahead of expert's knowledge, or there may be no subject matter experts at all relating to such topics.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
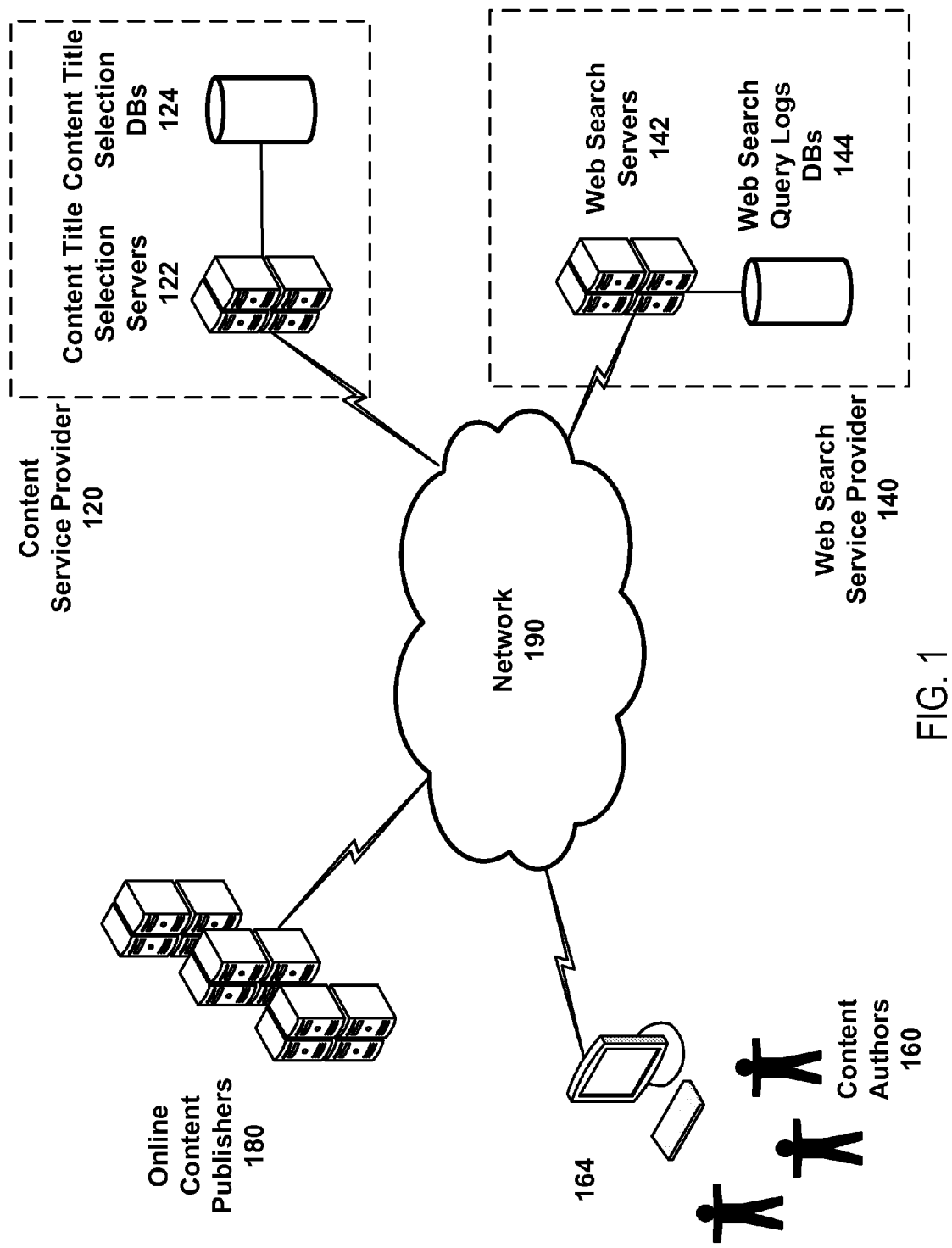
FIG. 1 illustrates a high-level view of components of one embodiment of systems that support evaluating search queries to identify titles for content production.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

For the purposes of this disclosure, "search term" should be understood to represent a string of one or more tokens that can convey a concept or set of concepts and can be used to search a database for entries relating to such concepts. A search term could comprise a single character or symbol, a single keyword or keyword stem, or group of keywords or a natural language phrase. Search terms can be used to form search queries, and search queries comprise one or more search terms.

Overview

A ready, and comprehensive, source of information that can provide up-to-the-minute insight into topics that are of interest to a broad array of users exists: query logs from, for example, Internet search services. Most, if not all, Internet users initially locate information relating to topics of interest using search queries. Thus, query logs can include search terms from millions of users that show, in detail, topics for which users are currently seeking more information. The challenge, however, presented by such query logs is the sheer volume of the information that precludes manual processing or analysis.

Various embodiments of the systems and methods disclosed herein relate to systems and methods for analyzing query logs to identify search queries relating to topics that could be used to define titles for online content having the greatest potential for generating online revenue. In one embodiment, queries are matched to search terms whose revenue generating potential has been estimated, and queries which are a close match to search terms having strong revenue generating potential are selected as titles for online content that can, for example, be created by an online content provider. In one embodiment, as discussed further below, a matching score may be calculated to represent the extent of matching between search terms having strong revenue generating potential and search queries.

One measure of the revenue generating potential of a search query is the lifetime value (LTV) of the query. The LTV of a search query is an estimate of the total online revenue content relating to the search query that is expected to be generated over its lifetime. In one embodiment, the LTV of a search query is estimated by matching the search query to search terms whose LTV is known. When the term that best matches the search query has been identified, the LTV value of that term can be used as the estimated LTV for the search query.

An LTV estimate of an individual search query based on the LTV of the closest matching search term can be viewed as a best case estimate for content that can be produced with a title based on that search query. Once the content has been produced, many other factors affect the actual LTV of the content. It can be generally assumed that in aggregate, the total pieces of content connected to an individual LTV term will average that LTV amount.

An Illustrative Implementation

FIG. 1 illustrates a high-level view of components of one embodiment of systems that can support evaluating search queries to identify titles for content production. A content service provider 120 provides online content to online publishers 180. Such content could include any form of electronic content capable of distribution to end users, such as documents and multimedia objects. Such content could relate to any topic of potential interest to online users. Online publishers 180 could offer a broad array of content relating to many topics, or could offer narrowly focused subject matter. In one embodiment, online publishers 180 pay the content provider for online content using any monetization techniques known in the art, such as, for example, by subscription, a flat fee for individual objects or a cost-per-view for individual objects (e.g. a fee charge every time a user views the object on the online publisher's website).

In one embodiment, the content service provider 120 selects titles of potential interest using various techniques, which could include identifying titles having the greatest revenue generating potential. Such titles can then be provided to content authors who develop content relating to the titles for the content provider 120. The authors 180 could be employees of the content service provider 120 or could be independent contractors or employees of another entity. In one embodiment, the content provider 120 identifies potential titles, at least in part, by analyzing query logs for Internet searches performed by users.

In one embodiment, content title selection servers 122 collect query logs from web search services 140 over a network 190, such as the Internet. In one embodiment, the web search service provider maintains one or more web search servers 142 connected to the Internet that provide web search services (e.g. web queries) to end users. The web search servers 142 maintain one or more query logs 144 that log all, or substantially all, web queries entered by end users. In one embodiment, the web search servers 140 provides means, such as an API or an FTP server, for content title selection servers 122 of a content service provider to periodically or continuously download data derived from web search query logs 144, such as, for example, all queries issued by users within a defined time range.

In one embodiment, the content title selection servers 122 process query log data retrieved from the web search service provider 140 to identify search queries that are potential content by estimating the LTV of the search queries and selecting search queries having an LTV greater than a preset threshold. In one embodiment, the content service provider maintains one or more content selection databases 144 that include LTVs for a plurality of search terms (i.e. LTV search terms). In one embodiment, the LTVs of search queries are estimated by matching the search queries to LTV terms in the content selection databases 144 using, for example, the techniques similar or identical to those described below in the section titled "An Illustrative Algorithm to Match Search Queries to Search Terms."

The systems shown in FIG. 1 are purely illustrative, and other configurations are possible, as will be readily apparent to those skilled in the art. For example, web query services, content development and authoring services and online publishing services could all be provided by a single service provider and hosted on one or a cluster of networked servers located at one or more physical locations.

Figure 2:
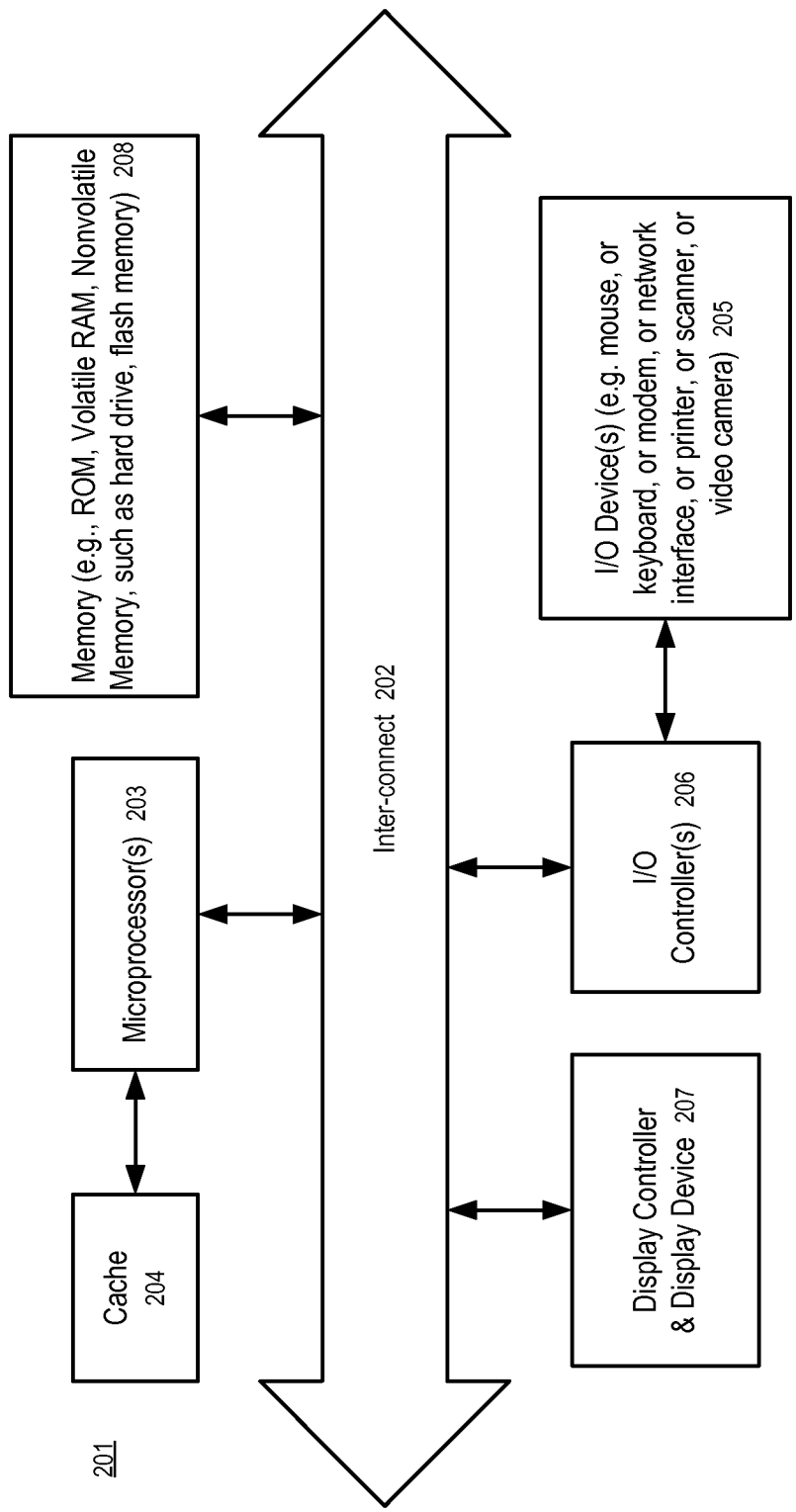
FIG. 2 shows a block diagram of a data processing system which can be used in various embodiments of the disclosed system and method.

FIG. 2 shows a block diagram of a data processing system which can be used in various embodiments of the disclosed system and method. While FIG. 2 illustrates various components of a computer system, it is not intended to represent any particular architecture or manner of interconnecting the components. Other systems that have fewer or more components may also be used.

In FIG. 2, the system 201 includes an inter-connect 202 (e.g., bus and system core logic), which interconnects a microprocessor(s) 203 and memory 208. The microprocessor 203 is coupled to cache memory 204 in the example of FIG. 2.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the content title selection servers 122, web search servers 142, as well as systems used by content authors 160 and online publishers 180 of FIG. 1 can be implemented using one or more data processing systems as illustrated in FIG. 1. In some embodiments, one or more servers of the system illustrated in FIG. 1 can be replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 203 and/or the memory 208. For example, the functionalities described above can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 3:
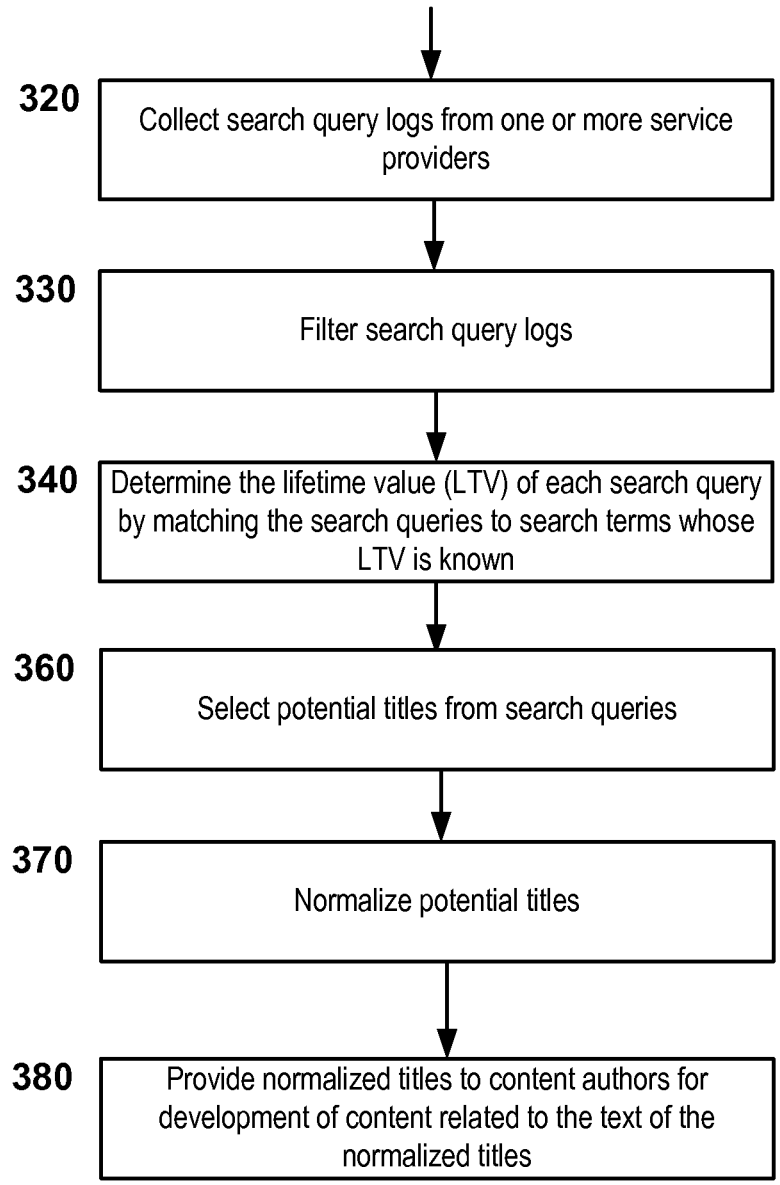
FIG. 3 shows one embodiment a method for evaluating search queries to identify titles for content production.

FIG. 3 shows in one embodiment a method for evaluating search queries to identify titles for content production. In one embodiment, one or more servers such as the content title selection servers shown in 122 of FIG. 1 perform the operations of the method shown in FIG. 3, and content title selection databases such as that shown in 124 of FIG. 2 store the data collected and/or used by various operations of the method.

In block 320, one or more processes running on a server collect search query logs from one or more service providers over a network, such as the Internet. The service providers could be web search service providers, or could be other types of services that collect and analyze query logs from web search service provides and other online businesses. The query logs could be collected using any technique known in the art such as a real-time feed, an API or batched data transfers via FTP or some other bulk data transmission protocol. The query logs could be provided in any form such as, for example, raw text, compressed text or text encoded using any encoding scheme known in the art. Data could be collected continuously or periodically, such as once per week or once per month.

In block 330, one or more processes running on the server filter search query logs to eliminate or reduce the volume of undesirable or unusable data in query log data. In one embodiment, the query log data is processed to eliminate duplicate queries. In one embodiment, counts for individual search queries could be determined and queries that do not appear at least a threshold number of times in a given time period, for example, 100 in a week, can be dropped. In one embodiment, commonly misspelled words can be corrected. In one embodiment, search terms containing blacklisted words or phrases, for example, obscene, racist, or sexist terms or phrases, can be dropped. Other filter criteria will be readily apparent to those skilled in the art. In one embodiment, this operation is optional, and the succeeding operations of the method process raw query log data.

In block 340, one or more processes running on the server determine the lifetime value (LTV) of each search query by matching each query to search terms whose LTV is known. In one embodiment, search terms with known LTVs are stored on a database accessible to the processes running on the server. The LTV of such search terms can be determined by a variety of methods, including those described below in "An Illustrative Method to Determine the LTV of Search Terms." In one embodiment, search queries are matched to search terms using matching techniques similar or identical to those described below in "An Illustrative Algorithm to Match Search Queries to Search Terms" in which a matching score is computed for each search term matched to a search query.

In one embodiment, the LTV of the search query is set equal to the LTV of the search term having the highest matching score to the search query. In one embodiment, the LTV of the search query is set equal to an average of the LTV of a predetermined number of search terms, for example, three, having the highest matching score to the search query. In one embodiment, search terms having a matching score to the search query below a threshold, for example, 0.2, are deemed not to match. If no search terms match the search query, the search query may be deemed to have an LTV of zero or some predetermined default value or may be discarded.

In block 360, one or more processes running on the server select potential titles from search queries whose LTV is known using at least one selection criteria that relates to the LTV of the respective potential titles. In one embodiment, search queries having a minimum LTV are selected. In one embodiment, search queries within a range of LTVs are selected (e.g. 120-240).

In one embodiment, potential titles could be selected using a rule based process such as that described in Provisional Application Ser. No. 61/307,702, filed Feb. 24, 2010, entitled "Rule-Based System and Method to Associate Attributes to Text Strings" the entire contents of which are incorporated by reference herein in its entirety. In one embodiment, the selection criteria could comprise rules relating to, a content provider's publication criteria, such as, for example, including or excluding specific categories or topics or including or excluding combinations of specific categories or topics, traffic estimates for the search queries, advertising rates, and click-through-rate. Such processing could further associate additional metadata with potential titles as disclosed in Provisional Application Ser. No. 61/307,702. In one embodiment, potential titles, and generated metadata if applicable, could be input to further selection processes, which could include further selection or rejection by other automated processes or human editors.

In block 370, one or more processes running on the server normalize 370 the text of selected titles. In one embodiment, the text of selected titles are edited to create clear, comprehensible title text that is grammatically correct. In one embodiment, if common spelling errors were not corrected earlier in the process, spelling errors are corrected at this time. In one embodiment, title text is automatically normalized using natural language processing techniques such as those which are well known to those skilled in the art. In one embodiment, title text may be normalized by human editors. In one embodiment, this operation is optional, and potential titles comprise raw search queries selected by the preceding operations of the methods and, if applicable, associated metadata produced in block 360 as described above.

In block 380, one or more processes running on the server provide the normalized titles to content authors for development of content related to the title text. In one embodiment, the normalized titles can be provided electronically to content authors using any method now known or to be later developed suitable for the delivery of electronic information such as, for example, by email, batch FTP or an interactive website. Alternatively, the normalized titles can be provided to content authors in non-electronic form such as, for example, hard copy reports.

Alternatively, or additionally, the normalized titles can be stored on one or more databases such as, for example, the content title selection databases such as that shown in 124 of FIG. 2. The databases containing normalized titles could then be used, for example, to produce reports, emails or be linked to an interactive website accessible to content authors.

An Illustrative Method to Determine the LTV of Search Terms

In one embodiment, the LTV of search terms can be determined using techniques as disclosed in U.S. patent application Ser. No. 12/337,550, entitled "Method and System for Ranking of Keywords," the entire disclosure of which is included by reference herein in its entirety. In one embodiment, the LTV of a search term can be calculated as $$LTV = TE \times AR \times CTR \times 12 \times LV$$

where TE is a traffic estimate (e.g. monthly)
AR is an advertising rate
CTR is a click-through-rate
12 is used to scale the calculation from monthly to yearly
LV is a longevity value of the search term in years
(note that LTV is one embodiment of a "ranking value" or RV, as disclosed in the Ser. No. 12/337,550 application).

In one embodiment, the traffic estimate (TE) is an estimate of the number of views per month that content built around a search term is predicted to receive. In one embodiment, the TE can estimated using various techniques using factors which could include scores indicating the bid values of search terms, the click through rates for search terms, the search volume of search terms, the ranking of websites in searches returned as matches to search terms, the number of words in search terms, the number of letters in a search term, and the competitiveness of the category into which search terms fall.

In one embodiment, the advertising rate (AR) is a measure of how much advertisers are paying for each search term. The AR can be determined from information obtained for a fee or for free from other sources, such as those maintained by companies offering search engines and other search services.

In one embodiment, data are obtained from various advertising rate sources, and are analyzed and combined to produce a net value for the AR.

In one embodiment, the click-through-rate (CTR) is a measure of how many people clicked on or selected advertisements that appeared in connection with search results for a search term. Various methodologies can be employed to determine click-thru metrics using only empirical data recording the number of searches relating to a specific term and the frequency with which those searchers click on advertising. In one embodiment, the value of the Click-Thru Rate (CTR) can range between 0.1% to 40%.

In one embodiment, the longevity value (LV) is a measure of the longevity associated with content built around a particular search term (e.g. how many years will there be a demand for the content). In one embodiment, categories of search terms are mapped to durations of time based on expert analysis. Search terms can then be mapped to a category. For example, in one embodiment, the search term "shovel" falls under the category "gardening" and "DVD player" falls under the category "home electronics." The search term can then be assigned the LV of the matching category.

An Illustrative Algorithm to Match Search Queries to Search Terms

In one embodiment, a search query can be matched to search terms with known LTVs by determining how many words exist in both the search query and the search terms. The more words the search query and any given term have in common, the better the match. When the term that best matches the search query has been identified, the LTV value of that term becomes the estimated LTV for the search query.

In one embodiment, a matching score between an LTV term (a term having a known LTV) and a search query that is a potential title can be expressed as a number between 0 (no match) and 1 (perfect match). It depends on:
  (i) The weighted count of words in the LTV term, $W_{ltv}$
  (ii) The weighted count of the potential title (search query) words, $W_t$
  (iii) The weighted count of unique matching words between the LTV Term and the Title, $W_m$ In one embodiment, the count for each word in the search query and the LTV search term assigned a weight reflecting the relative significance of the word for matching purposes. In one embodiment, the words are weighted in such a way that stop words receive 10% of the weight of a non-stop word. The weighting for stop words and non-stop words is not limited to the one described. Other weighting factors that could be taken into account are:
  The part of speech of a word.
  The length of a word.
  The corpus frequency of a word.
  Feedback from a human.

Thus, in one embodiment, words which are deemed as relatively unimportant in understanding the meaning of a search query or search term are assigned a weight of 0.1. In one embodiment, such words could include categories of words, for example stop words, prepositions and conjunctions. Such words could also include specific, commonly used words that generally do not convey additional information, such as "use." In one embodiment, a list of words that are assigned a weight of 0.1 can be stored on a database.

In one embodiment, words which are deemed as relatively important in understanding the meaning of a search query or search term are assigned a weight of 1.0. In one embodiment, such words could include categories of words, for example nouns. Such words could also include specific words generally convey additional information, such as "easiest." In one embodiment, a list of words that are assigned a weight of 1.0 can be stored on a database.

In one embodiment, weights could be assigned to words based on their usage within a search query or LTV term using natural language processing, heuristic rule based processing or classifiers trained using manually labeled data. In the example below, "a," "to" and "use" are assigned a weight of 0.1 and the remaining words are assigned a weight of 1.0.

In one embodiment, the words are matched verbatim, ignoring order, punctuation and casing. Even a difference in one character ("budget" vs. "budgets") will result in a no-match. The rationale behind this is that many LTV Terms have minor differences, but can have significantly different LTVs. When calculating $W_m$, matching words are only counted once, even if they occur multiple times in the potential title and/or the LTV term.

In one embodiment, the matching score function can be expressed as:

$$\text{MatchingScore} = (W_m \div W_{ltv})^2 \times (W_m \div W_t)$$

where $(W_m \div W_{ltv})^2$ can be interpreted as the percentage (squared) of the LTV term that is matching;

and $(W_m \div W_t)$ can be interpreted as the percentage of the search query (potential title) that is matching.

Examples of the application of the above algorithm are as follows. Suppose a search query extracted from a search query log is:

"Easiest Hearing Aid to Use"

and three LTV search terms that at are a partial match to the search query (e.g. includes at least one word from the search query) are selected from a database of LTV search terms comprising:
  1. hearing aid
  2. a hearing aid
  3. hearing In actual practice, for any given search query, the number of search terms that are at least a partial match to a given search query could vary greatly, from zero to hundreds of possible matches. In one embodiment, a search query could be matched against every entry in a LTV search term database. In one embodiment, search terms comprising at least one word from the search query could be selected using conventional database query facilities, such as via SQL queries. In another embodiment, search terms comprising at least one word from the search query could be selected from in an in-memory list of search terms.

In one embodiment, matching scores for the example data can be computed per the above methodology as follows. Note in the following matching score computations, the matching words are underlined and the weighted word score computation is in brackets.

1. Hearing Aid
  Easiest Hearing Aid to Use<=>hearing aid
  [1+1+1+0.1+0.1] [1+1]
  $W_t = 3.2$
  $W_{ltv} = 2$
  $W_m = 2$
  The matching score is:

$$(2 \div 2)^2 \times (2 \div 3.2) = 0.6250$$

2. A Hearing Aid
  Easiest Hearing Aid to Use<=>a hearing aid
  [1+1+1+0.1+0.1] [0.1+1+1]
  $W_t = 3.2$
  $W_{ltv} = 2.1$
  $W_m = 2$ The matching score is:

$(2 \div 2.1)^2 \times (2 \div 3.2) = 0.5669$

3. Hearing

Easiest Hearing Aid to Use<=>hearing

[1+1+1+0.1+0.1] [1]

$W_t = 3.2$
$W_{ltv} = 1$
$W_m = 1$

The matching score is:

$(1 \div 1)^2 \times (1 \div 3.2) = 0.3125$

Thus, in the above example, the LTV term "hearing aid" has the highest matching score, and in one embodiment, the LTV of this term could be used to set the estimated LTV of the search query "Easiest Hearing Aid to Use." As an example, if the estimated LTV of the search query equals or exceeds a predetermined monetary threshold, then the search query can be tagged as being suitable for use as a title in a content item. The search query/title may be sent, for example, to a content author for the creation of an content item having this title.

In one embodiment, in order to avoid false positives, (i.e. incorrect matches), a minimum matching score can be set that that must be met or exceeded. A score below that threshold is treated as a no-match. Experiments have determined that 0.2 is a good threshold for the type of titles and LTV terms most commonly evaluated. For example, assume there is an LTV search term "to use financial aid" which shares three words in common with the search query "Easiest Hearing Aid to Use." The matching score for this term can be computed.

Easiest Hearing Aid to Use<=>to use financial aid

[1+1+1+0.1+0.1] [0.1+0.1+1+1]

$W_t = 3.2$
$W_{ltv} = 2.2$
$W_m = 1.2$

The matching score is:

$(1.2 \div 2.2)^2 \times (1.2 \div 3.2) = 0.1116$

Thus, the term falls below the 0.2 threshold, and this term can be excluded from further consideration.

Conclusion

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:

collecting, using a computing device over a network, a plurality of search queries from at least one search query data source;

determining, using the computing device, a lifetime value for each of the plurality of search queries to provide a plurality of lifetime values, each of the plurality of lifetime values reflecting a respective estimate of respective total online revenue a respective search query is expected to generate over its lifetime, wherein determining the respective lifetime value for each of the plurality of search queries includes matching each respective search query to at least one search term having a known lifetime value, wherein matching each respective search query to the at least one search term includes computing a matching score for the respective search term using the respective search term and the respective search query, and wherein the matching score is computed according to the equation:

$$MatchingScore=(W_m \div W_{ltv})^2 \times (W_m \div W_t),$$

where $W_{ltv}$ is a weighted sum of words in the respective search term, $W_t$ is a weighted count of words in the respective search query, $W_m$ is a weighted count of unique matching words between the respective search term and the respective search query;

selecting, using the computing device, a plurality of potential titles from the plurality of search queries using at least one selection criteria associated with the plurality of lifetime values; and providing the plurality of potential titles to at least one content author.

2. The method of claim 1 wherein the lifetime value for each of the plurality of search queries is set equal to the lifetime value of one of the at least one search terms having the highest matching score to the respective search query.

3. The method of claim 1 wherein the lifetime value for each of the plurality of search queries is set equal to an average of the lifetime value of a set of the at least one search terms having the highest matching scores to the respective search query.

4. The method of claim 1 wherein if one or more of the plurality of search queries do not match any of the plurality of search terms, the lifetime value of the respective search query is set to a default value.

5. The method of claim 1 wherein the at least one selection criteria comprises a minimum search query lifetime value.

6. The method of claim 1 wherein the at least one selection criteria comprises a set of rules.

7. The method of claim 1 wherein selecting the plurality of potential titles using the at least one selection criteria comprises generating metadata for each of the plurality of search queries.

8. The method of claim 1 additionally comprising:
filtering, using the computing device, the plurality of search queries.

9. The method of claim 8 wherein filtering comprises eliminating duplicate search queries from the plurality of search queries.

10. The method of claim 8 wherein filtering comprises eliminating search queries that do not appear in the plurality of search queries at least a threshold number of times.

11. The method of claim 8 wherein filtering comprises eliminating search queries having one or more words on a blacklist from the plurality of search queries.

12. The method of claim 8 wherein filtering comprises correcting misspelled words in the plurality of search queries.

13. The method of claim 1 additionally comprising:
normalizing, using the computing device, each of the plurality of potential titles.

14. The method of claim 13 wherein normalizing comprises correcting spelling errors in each of the plurality of potential titles.

15. The method of claim 13 wherein normalizing comprises correcting grammatical errors in each of the plurality of potential titles.

16. A non-transitory machine readable media storing instructions that, when executed by a computing device, cause the computing device to perform a method, the method comprising:

collecting, over a network, a plurality of search queries from at least one search query data source;

determining a lifetime value for each of the plurality of search queries to provide a plurality of lifetime values, each of the plurality of lifetime values reflecting a respective estimate of respective total online revenue a respective search query is expected to generate over its lifetime, wherein determining the lifetime value for each of the plurality of search queries includes matching each respective search query to at least one search term having a known lifetime value, wherein matching each respective search query to the at least one search term includes computing a matching score for the respective search term using the respective search term and the respective search query, and wherein the matching score is computed according to the equation:

$$MatchingScore=(W_m \div W_{ltv})^2 \times (W_m \div W_t),$$

where $W_{ltv}$ is a weighted sum of words in the respective search term, $W_t$ is a weighted count of words in the respective search query, $W_m$ is a weighted count of unique matching words between the respective search term and the respective search query;

selecting a plurality of potential titles from the plurality of search queries using at least one selection criteria associated with the plurality of lifetime values; and adding the plurality of potential titles to a database stored on a computer readable medium.

17. A computer system comprising:
a processor; and
memory coupled to the processor and storing instructions that, when executed by the processor, cause the computer system to:
collect a plurality of search queries from at least one search query data source;
determine a lifetime value for each of the plurality of search queries to provide a plurality of lifetime values, each of the plurality of lifetime values reflecting a respective estimate of respective total online revenue a respective search query is expected to generate over its lifetime, wherein determining the lifetime value for each of the plurality of search queries includes matching each respective search query to at least one search term having a known lifetime value, wherein matching each respective search query to the at least one search term includes computing a matching score for the respective search term using the respective search term and the respective search query, and wherein the matching score is computed according to the equation:

$$MatchingScore=(W_m \div W_{ltv})^2 \times (W_m \div W_t),$$

where $W_{ltv}$ is a weighted sum of words in the respective search term, $W_t$ is a weighted count of words in the respective search query, $W_m$ is a weighted count of unique matching words between the respective search term and the respective search query;

select a plurality of potential titles from the plurality of search queries using at least one selection criteria associated with the plurality of lifetime values; and provide the plurality of potential titles to at least one content author.

\* \* \* \* \*